No. 647,119. Patented Apr. 10, 1900.
T. SEEHAUSEN.
PROCESS OF COMPOUNDING FILLINGS FOR RUBBER TIRES.
(Application filed Apr. 20, 1899.)
(No Model.)
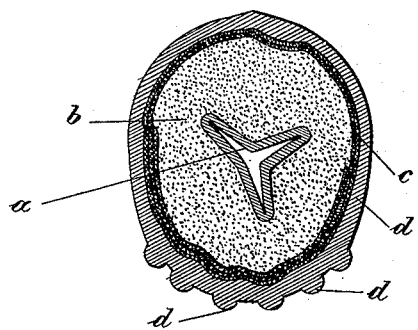
Witnesses
Inventor,
Theodor Seehausen

UNITED STATES PATENT OFFICE.

THEODOR SEEHAUSEN, OF HELSINGBORG, SWEDEN.

PROCESS OF COMPOUNDING FILLINGS FOR RUBBER TIRES.

SPECIFICATION forming part of Letters Patent No. 647,119, dated April 10, 1900.

Application filed April 20, 1899. Serial No. 713,815. (No specimens.)

*To all whom it may concern:*

Be it known that I, THEODOR SEEHAUSEN, a subject of the German Emperor, residing at No. 36 Karlkroksgatan, Helsingborg, in the Kingdom of Sweden, have invented a certain new and useful Process of Compounding Fillings for Rubber Tires and the Like, of which the following is a specification.

The subject of the present invention is a process of compounding fillings for rubber tires and the like, especially suited for the manufacture of cycle-tires containing a central air-tube. Applied around the latter the compound manufactured according to the new process affords a thoroughly-effective means for preventing punctures. It has the further advantage of being much lighter than rubber, so that a tire such as described will compare most favorably with a solid tire as regards weight and at the same time will be found to possess all the necessary elasticity, such as it is now sought to insure by the use of pneumatic tires.

The accompanying drawing shows, by way of example, how a filling compounded according to the new process may be applied in the manufacture of cycle-tires. The figure illustrates such a tire in cross-sectional view.

*a* is a central air-tube of any suitable form and diameter made of ordinary rubber.

*b* is the protective filling compounded according to the process forming the subject of the present invention.

*c* is an intermediate layer of cotton, linen, or the like between the filling *b* and the outer covering *d*, which may be of ordinary vulcanized rubber.

The new filling consists of a mixture of different substances, of which one of the principal is the tough vegetable fibrous material known as "loofah." This is softened in oil and under the application of heat compounded with the following substances: vulcanized floating and ground rubber-waste, cleaned patent waste, rosin-oil, solar-oil, turpentine, sulfur, ammonia, soda, and ground acetate of lead. The loofah loses nothing of its tough light character; but in conjunction with the other materials forms an extremely elastic durable mass particularly suitable for cycle-tires.

The precise method of procedure in manufacturing the filling is as follows: I take three kilograms of light floating ground vulcanized rubber, which may be ordinary rubber-waste, and mix it with 0.6 kilogram of rosin-oil and heat the mixture in a boiler for about two hours at a pressure of about forty-five pounds per square inch. To this mixture I then add a second mixture consisting of one kilogram of ground vulcanized patent rubber-waste which has been first washed in water and then dried, 0.5 kilogram of loofah fiber, (*Luffa cylindrica*,) 0.7 kilogram of solar-oil, and 0.75 kilogram of turpentine. To this mass is then added a mixture of one kilogram of india-rubber, 0.15 kilogram of sulfur, 0.35 kilogram of ammonia, 0.6 kilogram of soda, and 0.15 kilogram of neutral acetate of lead. The whole is then drawn on a calender-machine and is then ready to be applied for the purpose for which it is destined.

It will be found advantageous to first soak the loofah in oil in order to soften it before applying it, as above mentioned.

Although I have stated the definite proportions of the various ingredients which I prefer to use, such proportions may naturally be slightly varied without departing from the essential feature of the invention.

Sheets of this filling material prepared as above described will be found to be exceedingly tough, elastic, and porous and may be applied to a variety of uses.

In manufacturing a tire such as shown on the drawing a sheet of the material *b* is wrapped around the central air-tube *a* until the required thickness of tire is obtained. In thus wrapping on the compound more material should be laid on the outer or tread side of the tire than on the inner side, which comes next the rim. The surface of the sheet *b* may be smeared over with a coating of suitable adhesive material, so that when tightly wrapped around the air-tube a solid mass or filling is formed. When the compound *b* has thus been wrapped around the air-tube *a*, one or more layers of canvas, linen, or the like are applied and a rubber covering *d* then placed over the whole, the edges brought together, set in a mold, and vulcanized in the ordinary manner to form a tire. A tire manufactured in this way will be perfectly safe against puncture, the air-tube being most effectively protected. The central air-tube may be one which can be pumped full of air or may be such as contains air confined during the process of manufacture. Both as regards weight and easy manufacture the new tire will compare very favorably with ordinary pneumatic tires. The filling may likewise be employed for solid tires, the elasticity and lightness being much superior to those of rubber as ordinarily made. The new material, it will be observed, contains no ingredient that is subject to fermentation or that will become hard, wherefore the mass will remain permanently elastic and durable and will not require to be renewed.

A commercial advantage of great importance possessed by the new filling is its cheapness, since in addition to the loofah the chief ingredients are simply waste materials from rubber factories, such as have hitherto not been successfully employed for like purposes in tire manufacture.

Having thus described my invention, what I claim as new, and desire to secure by Letters Patent, is—

The process of manufacturing a rubber compound, consisting in mixing light ground vulcanized rubber with rosin-oil, heating it for about two hours at a pressure of about forty-five pounds per square inch; then adding to the mass a second mixture of ground vulcanized patent rubber-waste, which has first been washed in water and then dried, with loofah fibers, solar-oil and turpentine; and finally adding to this mass a mixture of india-rubber, sulfur, ammonia, soda and neutral acetate of lead, all substantially in the proportions described, substantially as and for the purposes set forth.

In witness whereof I have hereunto set my hand in presence of two witnesses.

THEODOR SEEHAUSEN.

Witnesses:
WOLDEMAR HAUPT,
HENRY HASPER.